United States Patent [19]
Tertilt et al.

[11] Patent Number: 6,029,420
[45] Date of Patent: Feb. 29, 2000

[54] BRAKING DEVICE FOR BALE WRAPPING MATERIAL

[75] Inventors: Werner Tertilt, Marienfeld; Dirk Esken, Soest, both of Germany

[73] Assignee: Usines Claas France, St. Remy/Woippy, France

[21] Appl. No.: 09/108,878

[22] Filed: Jul. 1, 1998

[30] Foreign Application Priority Data

Jul. 5, 1997 [DE] Germany .......................... 197 28 854

[51] Int. Cl.$^7$ .................................................. B65B 11/04
[52] U.S. Cl. .............................. 53/118; 53/587; 53/389.2
[58] Field of Search .......................... 53/118, 587, 389.2, 53/389.4; 242/419; 226/195

[56] References Cited

U.S. PATENT DOCUMENTS

| | | | |
|---|---|---|---|
| 2,648,382 | 8/1953 | Dewyer ............................... | 53/389.4 X |
| 4,604,848 | 8/1986 | Clostermeyer ........................... | 53/118 |
| 4,787,193 | 11/1988 | Verhulst et al. .......................... | 53/118 |
| 4,816,109 | 3/1989 | Ingram .................................. | 53/587 X |
| 5,086,610 | 2/1992 | Maki-Rahkola et al. .................. | 53/587 |
| 5,181,368 | 1/1993 | Anstey et al. ........................... | 53/118 X |
| 5,230,193 | 7/1993 | Underhill et al. ......................... | 53/556 |
| 5,243,806 | 9/1993 | Jennings et al. .......................... | 53/118 |
| 5,317,858 | 6/1994 | Hanai ................................... | 53/389.2 X |

FOREIGN PATENT DOCUMENTS

| | | | |
|---|---|---|---|
| 33 27 042 C2 | 7/1983 | Germany ......................... | A01F 15/12 |
| 34 24 567 C2 | 7/1984 | Germany ......................... | A01F 15/07 |
| 36 34 571 C2 | 10/1986 | Germany ......................... | A01F 15/07 |
| 195 17 385 A1 | 5/1995 | Germany ......................... | A01F 15/12 |
| 2 144 102 | 10/1986 | United Kingdom ............ | A01F 15/00 |

*Primary Examiner*—Linda Johnson
*Attorney, Agent, or Firm*—Husch & Eppenberger, LLC; Robert E. Muir

[57] ABSTRACT

The present invention relates to a round baler for agricultural crop material having a press chamber for pressing the crop material and a wrapping device for wrapping the fully pressed round bales of crop material, wherein the wrapping material is secured on a web roll. The web roll is provided with a brake rod acting on the outside diameter of the bale. The essential characteristics of the invention are that a brake rod is affixed to one lever arm of a two-armed pivot lever and the effective linkage point of a plurality of tension springs is positioned the other lever arm. The linkage point's position is automatically variable relation to a stationary pivot point of the pivot lever as a function of the respective diameter of the web roll.

13 Claims, 2 Drawing Sheets

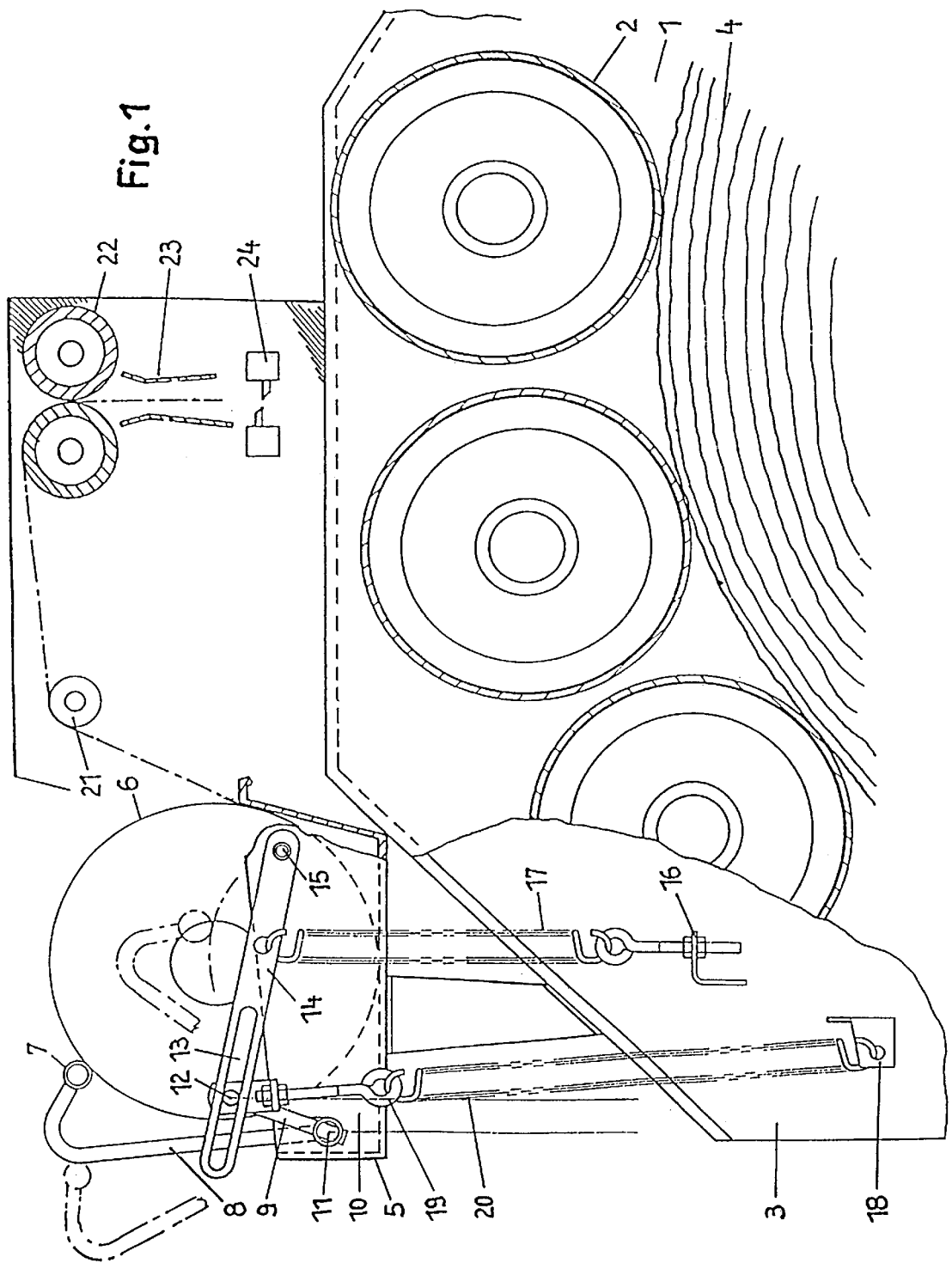

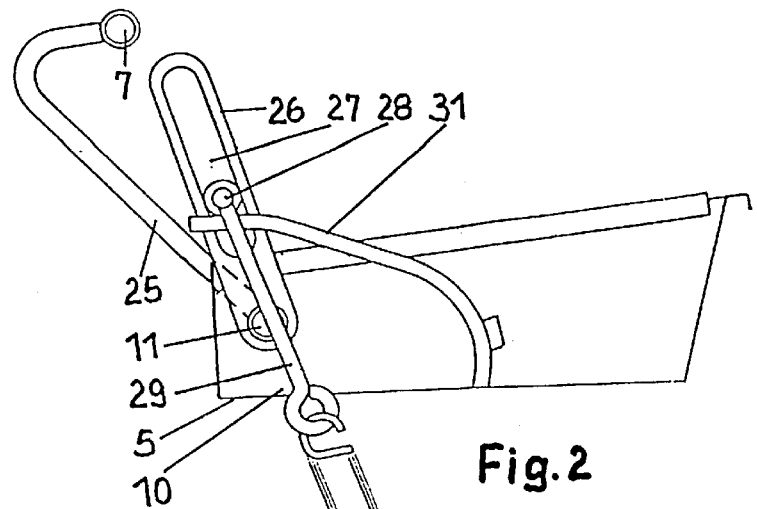
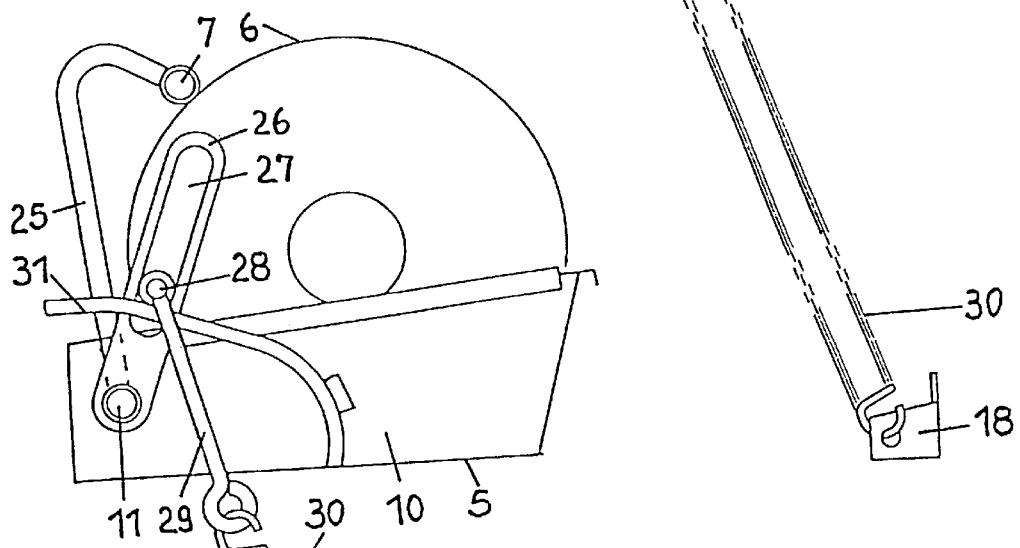
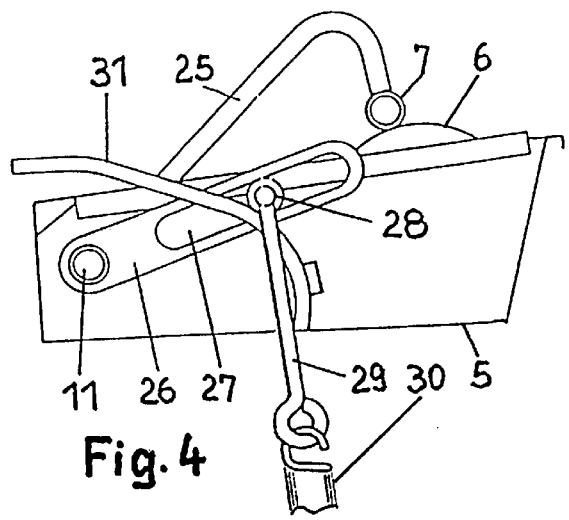

6,029,420

BRAKING DEVICE FOR BALE WRAPPING MATERIAL

BACKGROUND OF THE INVENTION

The present invention relates generally to agricultural machinery and, more particularly, to improvements to balers for harvested crops.

Round balers are known in various designs. For example in German Patent 3 327 042 C2 is described a large baling press with several driven press rollers and a device for receiving a web roll of wrapping material for a pressed bale. To maintain uniform tension of the wrapping material, a brake rod is mounted between two pivot levers acting on the web roll. The brake rod also reduces the weight of the roll and hence reduces the friction in the net recess. Both effects ensure that the net tension decreases as the size of the roll decreases. The pivot levers are mounted on a shaft which is connected by stays to the side walls of the press. The contact pressure of the brake rod on the web roll is obtained by a tension spring acting on a lever system and arranged between the pivot levers and the press frame. The design has the disadvantage that, as the outside diameter of the web roll decreases and the angle of inclination of the pivot levers decreases as a result, the effective length of the tension spring decreases as well. Accordingly there is also a resultant decrease in the spring force.

It is the object of the invention to provide a braking device for a web roll of bale wrapping material that ensures functionally sufficient web tension for the process of wrapping the pressed bales over the whole diameter range of the outer periphery of the web roll.

SUMMARY OF THE INVENTION

In accordance with the present invention there is provided a round baler for bailing harvested crop material and having a press chamber for pressing the harvested crops, a wrapping device for wrapping the fully pressed round bales, a shaftless web roll mounted in a receptacle upon which the wrapping material is arranged, a braking device for providing sufficient web tension for the process of wrapping the pressed bales over the whole diameter range of the outer periphery of the web roll and comprising a brake rod acting via a lever system, tension springs on the outside diameter of the web roll, and a two-armed pivot lever.

The solution according to the preferred embodiment makes it possible to obtain uniform quality of the casing of the round bales over the whole harvesting process with little technical effort.

BRIEF DESCRIPTION OF THE DRAWINGS

The invention is described in more detail below by two practical examples.

FIG. 1 is a schematic view of the upper region of a round baling press with a bale wrapping device in a schematic longitudinal sectional view;

FIG. 2 is a side view of another embodiment of a braking device for a web roll and shown in the inserted position for the web roll;

FIG. 3 is a side view of the braking device of FIG. 2 and including a web roll with a large outside diameter; and FIG. 4 is a side view of the braking device according to FIG. 2 and including a web roll with a small outside diameter.

DETAILED DESCRIPTION

A round baling press is shown only partially in FIG. 1. It has a press chamber 1, several press rollers 2 arranged at the circumference of the press chamber 1 and side walls 3, along with a round bale 4 of crop material. A receptacle 5 for receiving a shaftless web roll 6 for the wrapping material of a fully pressed round bale 4 is mounted above the press chamber 1.

To achieve sufficient web tension at every outside diameter of the web roll 6, the web roll 6 is provided with a braking device. The braking device consists of a brake rod 7 which extends across the full width of the web roll 6 and is pressed by a spring-loaded lever system against the respective outer circumference of the web roll 6, thereby braking the web roll 6 during the unrolling movement. An angled pivot lever with two lever arms 8, 9 of differing lengths is attached at one or both ends of the brake rod 7. The pivot lever is arranged at a stationary pivot point 11 mounted on the side wall 10 of the receptacle 5. The free end of the short lever arm 9 has a journal 12 or roller which is secured in a slotted guide 13 of a pivotal guide lever 14. The length of the slotted guide 13 ensures the efficiency of the braking device within the whole diameter range of the web roll 6. The guide lever 14 is pivotally attached to the side wall 10 of the receptacle 5 at a hinge point 15. As the diameter of the web roll 6 decreases, the journal 12 or the roller automatically moves within the slotted guide 13 as a function of the diameter of the web roll 6 in a direction towards the hinge point 15 of the guide lever 14. The first tension spring 17 is mounted between a mounting 16 on the side wall 3 of the press chamber 1 and the guide lever 14. A second tension spring 20 is mounted to the journal 12 or the lever arm 9 in order to increase the tension force effect on the guide lever 14, between a suspension point 18 on the wall 3 and an eye bolt 19. However, this second tension spring 20 is not absolutely necessary. The lever arms 8, 9, the guide lever 14 and the first and second tension springs 17, 20 can also be arranged symmetrically on both walls 3 of the longitudinal sides of the round baling press. The possible positions of the lever arm 8 with the brake rod 7 are shown schematically by phantom lines in FIG. 1.

The possible sliding or rolling movement of the journal 12 or roller within the slotted guide 13 of the guide lever 14, the working variable lever ratios between the first and second tension springs 17, 20 and the brake rod 7 are automatically adapted to the changing outside diameter of the web roll 6. Therefore, the brake force of the brake rod 7, which acts on the web roll 6 and is necessary for the function of net binding, is almost constant over the whole diameter range of the web roll 6.

After the pressing operation, the round bale 4 is encased in film or net material. The web is taken off the web roll 6 via a guide roller 21 and drive rollers 22 and passed over guide plates 23 to a pair of cutting blades 24, where it is cut off.

FIGS. 2, 3 and 4 show another embodiment of the braking device. In this embodiment the brake rod 7 is connected to a pivot lever with two lever arms 25, 26. The two lever arms 25, 26 are rigidly connected to each other and pivotal about a pivot point 11 on the side wall 10 of the receptacle 5. The brake rod 7 is attached to the free end of the long lever arm 25, while the shorter lever arm 26 comprises an oblong guide slot 27 for a roller 28 which is connected by a connecting pin 29 to a third tension spring 30. The third tension spring 30 is also attached to a suspension point 18 on the side wall 3 of the press chamber 1. In accordance with the outside diameter of the web roll 6, the roller 28 slides within the guide slot 27, while being guided along a rigid curved track 31, limiting the roller movement at the bottom. Due to the force effect of the third tension spring 30, the two-armed pivot lever presses the brake rod 7 against the outside of the web roll 6 and hence its unrolling speed is braked and the necessary web tension for the process of wrapping the round bale 4 is maintained. As the outside diameter of the web roll 6 decreases, the linkage point of the third tension spring 30, within the guide slot 27 in the lever arm 26, changes in a direction towards the free end of the lever arm 26. As a result the effective leverage between the pivot point 11 of the pivot lever and the linkage point of the third tension spring 30 increases, with almost constant force of the third tension spring 30, increasing the braking force of the brake rod 7 on the web roll 6.

Other objects, features and advantages will be apparent to those skilled in the art. While preferred embodiments of the present invention have been illustrated and described, this has been by way of illustration and the invention should not be limited except as required by the scope of the appended claims.

We claim:

1. A round baler for bailing harvested crop material and having a press chamber for pressing the harvested crops, a wrapping device for wrapping the fully pressed round bales, a receptacle in which a roll of wrapping material is arranged, a braking device mounted at the receptacle, the braking device comprising a brake rod, a lever system including a two-armed pivot lever, a first lever arm of the lever system carrying the brake rod, a second lever arm of the lever system having one end connected to the first lever arm via a stationary pivot point and the other end of the second lever arm having an effective linkage point which is variable to said stationary pivot point, and means acting on the lever system for automatically varying the position of the effective linkage point as a function of the web roll diameter to provide substantially equal braking force via the brake rod across the decreasing diameter of the web roll and for providing sufficient web tension during wrapping of the pressed bales over substantially the whole diameter range of the web roll.

2. A round baler according to claim 1, wherein said effective linkage point's position is variable to the stationary pivot point of the two-armed pivot lever as a function of the respective diameter of the web roll.

3. A round baler according to claim 1, including a guide lever connected to the second lever arm, and wherein said effective linkage point is arranged on the guide lever.

4. A round baler according to claim 1, wherein the last-mentioned means includes a tension spring, and the effective linkage point of the tension spring is arranged directly on the second lever arm.

5. A round baler according to claim 1, wherein the lever system includes an angled pivot lever mounted at each end of said brake rod.

6. A round baler according to claim 5, wherein said angled pivot levers each comprise the two-armed pivot lever, and wherein the arms are of differing lengths.

7. A round baler according to claim 1, including means for pivotally mounting said pivot lever at a stationary pivot point.

8. A round baler according to claim 1, including a roller mounted at the free end of said second lever arm to form the effective linkage point, a pivotal guide lever having an elongate, slotted guide for receiving the roller, and said roller moving within said slotted guide as a function of the web roll diameter.

9. A round baler according to claim 8, wherein the means acting on the lever system includes a tension spring located between a mounting on the wall of the press chamber and said pivotal guide lever.

10. A round baler according to claim 8, wherein the press chamber has a wall, and the means acting on the lever system includes a tension spring operatively connected to the roller and to the wall of the press chamber.

11. A round baler according to claim 8, including a curved track engaged with and guiding said roller.

12. A round baler according to claim 10, including a second tension spring connected to the guide lever and to the wall of the press chamber.

13. A round baler according to claim 1, wherein the press chamber has a wall, and the means acting on the lever system includes tension means operatively connected to the guide lever and to the wall of the press chamber.

* * * * *